UNITED STATES PATENT OFFICE.

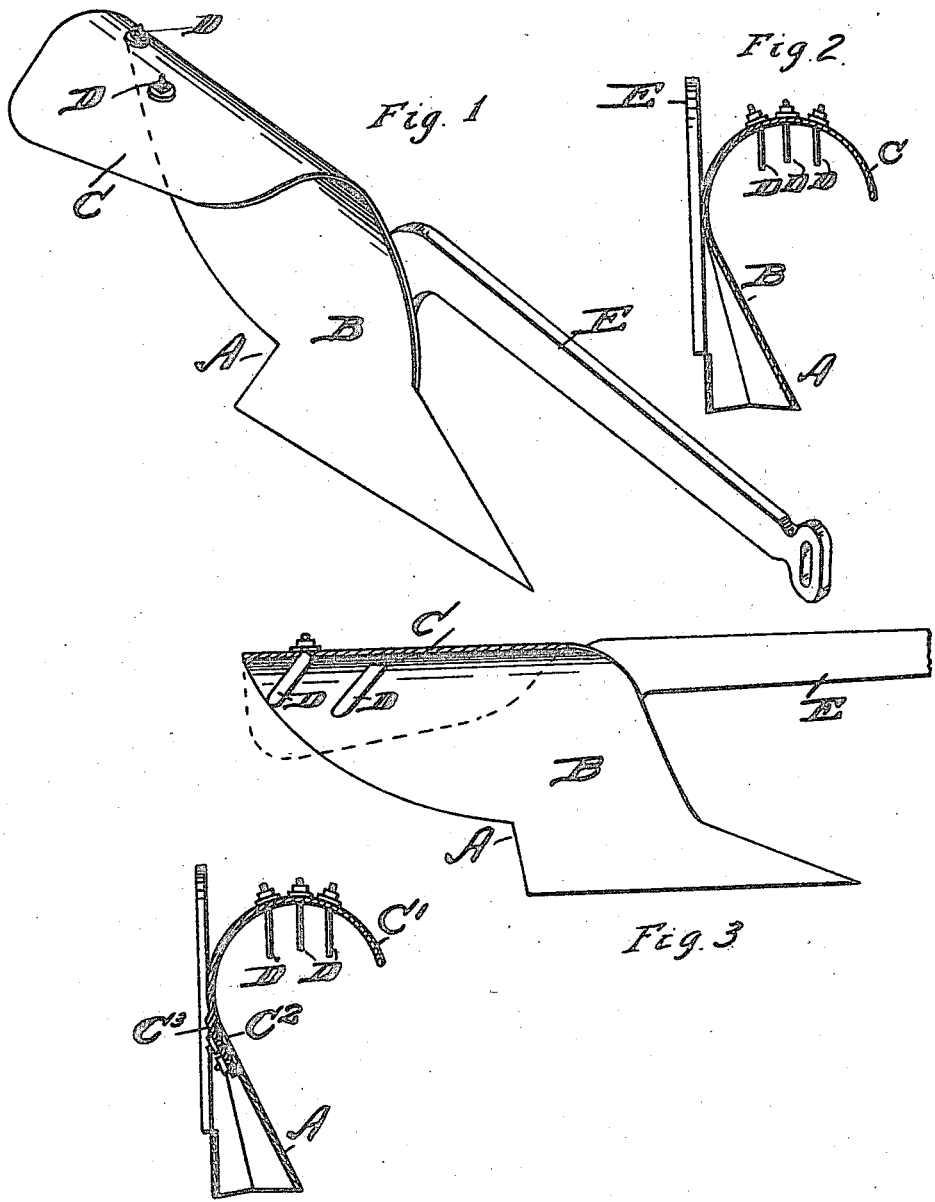

RALPH WHIPPLE, OF DETROIT, MICHIGAN, ASSIGNOR OF ONE-HALF TO CARL H. MICHELL, OF DETROIT, MICHIGAN.

PLOW.

1,416,392.          Specification of Letters Patent.          Patented May 16, 1922.

Application filed November 19, 1920. Serial No. 425,224.

*To all whom it may concern:*

Be it known that I, RALPH WHIPPLE, citizen of the United States, residing at Detroit, county of Wayne, State of Michigan, have invented a certain new and useful Improvement in Plows, and declare the following to be a full, clear, and exact description of the same, such as will enable others skilled in the art to which it pertains to make and use the same, reference being had to the accompanying drawings, which form a part of this specification.

My invention relates to an improvement in plows for use in connection with tractors shown in the accompanying drawings and more particularly described in the following specification and claims.

It has been found in practice that the ordinary plow when drawn by a tractor is apt to throw the soil a considerable distance instead of delivering it directly into the furrow. This is due to the usual size and shape of the mold-board and the speed at which the tractor operates.

The object of my invention is to so construct a plow that the sod upon moving upwardly upon the mold-board will be overturned and be deposited directly into the furrow, regardless of the speed at which the tractor may be operating, due to an overhanging guard or portion which extends rearwardly beyond the end of the mold-board proper but which may be an integral part thereof, or bolted thereto as desired.

A further object of the invention is to provide the overhanging guard or deflector with a plurality of cutter-blades, which may be either fixed or adjustably secured thereto, adapted to pulverize the sod as it is deflected by the arc-shaped guard into the furrow.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:

Figure 1 is a perspective view of a plow with an overhanging arc-shaped guard or deflector, extending rearwardly from the end of the mold-board proper of an ordinary plow.

Figure 2 is a cross sectional view through the plow and overhanging deflector portion, looking forward toward the rear end of the plow beam.

Figure 3 is a longitudinal vertical sectional view through the overhanging portion of the plow.

Figure 4 is a view somewhat similar to Fig. 3 of a modification in which the overhanging portion is bolted to the mold-board of an ordinary plow, the construction being such that the face of the mold-board is flush and tangent with the inner surface of the overhanging portion.

Referring now to the letters of reference placed upon the drawings:

A, is a plow, B its mold-board. C, is an arc-shaped overhanging portion integral with the mold-board and extending rearwardly beyond the end of the mold-board of usual construction.

D, D, D, denote a plurality of cutters which may be either rigidly or adjustably bolted to the inner face of the overhanging portion C, designed to cut or pulverize the sod upon the cutter reaching the overhanging portion which deflects it back into the furrow.

E, indicates a plow beam.

In the modification shown in Figure 4 the overhanging portion C' instead of being integral with the mold-board is a separate part secured to the mold-board by bolts $C^2$, which extend through the wall of the mold-board and an offset portion $C^3$ of the deflector underlying the wall of the latter;—the construction being such that the face of the mold-board and the inner wall of the deflector are flush with each other.

Having now indicated the several parts by reference letters the construction and operation of the device will be readily understood.

As stated in the opening paragraphs of this specification it has been found in practice that the ordinary form of plow when attached to a tractor and operated at the usual tractor speed will cause the soil to be thrown laterally to a considerable distance, instead of turning the soil and depositing it directly into the furrow in accordance with the usual practice.

By the use of my invention however, the soil as it moves upwardly upon the mold-board is directed downwardly by the rearwardly extending overhanging portion into the furrow, the soil being pulverized by cutters in its passage through the overhanging portion.

Having thus described my invention what I claim is:

1. In a plow, a mold-board, an overhanging portion adapted to direct the soil received from the mold-board back into the furrow, and a plurality of cutters extending downwardly from the rearward end inner face of the overhanging portion to pulverize the soil deflected into the furrow.

2. In a plow, a mold-board, an overhanging portion adapted to direct the soil received from the mold-board back into the furrow, and a plurality of cutters extending downwardly and rearwardly from the rearward end inner face of the overhanging portion to pulverize the soil deflected into the furrow.

In testimony whereof, I sign this specification in the presence of two witnesses.

RALPH WHIPPLE.

Witnesses:
 S. E. THOMAS,
 JOHN CONSIDINE, Jr.